United States Patent [19]
Yoon

[11] Patent Number: 6,046,552
[45] Date of Patent: Apr. 4, 2000

[54] SPOT ELIMINATING CIRCUIT OF AN IMAGE DISPLAY DEVICE

[75] Inventor: Kyung Choon Yoon, Suwon, Rep. of Korea

[73] Assignee: SamSung Electronics Co., Ltd., Kyungki-do, Rep. of Korea

[21] Appl. No.: 09/000,866

[22] Filed: Dec. 30, 1997

[30] Foreign Application Priority Data

Dec. 30, 1996 [KR] Rep. of Korea ............... 96-78031

[51] Int. Cl.[7] ............... H01J 29/52; G09G 1/04
[52] U.S. Cl. ............... 315/380; 315/381; 315/384; 348/173
[58] Field of Search ............... 315/3, 380, 381, 315/384; 348/173, 634, 637

[56] References Cited

U.S. PATENT DOCUMENTS

| | | |
|---|---|---|
| 4,340,910 | 7/1982 | Valdes . |
| 4,814,880 | 3/1989 | Kugimura ............... 348/637 |
| 5,043,639 | 8/1991 | Gurley et al. ............... 315/386 |
| 5,084,657 | 1/1992 | Ueda . |
| 5,677,730 | 10/1997 | Park . |

FOREIGN PATENT DOCUMENTS

| | | |
|---|---|---|
| 0090702 | 10/1983 | European Pat. Off. . |
| 63-158974 | 7/1988 | Japan . |

*Primary Examiner*—Edward P. Westin
*Assistant Examiner*—Nikita Wells
*Attorney, Agent, or Firm*—Robert E. Bushnell, Esq.

[57] ABSTRACT

A spot is prevented from occurring on the center portion of a cathode ray tube when electric power is turned off by using a voltage charged in a capacitor which are used for outputting a vertical blanking signal in a vertical blanking signal generating circuit of an image display device for displaying an image in use of the cathode ray tube. The present invention is provided with a discharge cut-off element between a negative electric power source and the capacitor for outputting a vertical blanking signal and a discharging element for discharging a charged voltage of the capacitor to the ground. The present invention prevents a charged voltage ofthe capacitor from being discharged until thermoelectrons are not emitted from the cathode so as to supply a negative charged voltage to the first grid of the cathode ray tube continuously, so that a spot is prevented from occurring. All the negative voltage charged in the capacitor is discharged when a time period has elapsed during which occurrence of a spot is blocked.

7 Claims, 3 Drawing Sheets

FIG.1A *(Prior Art)*
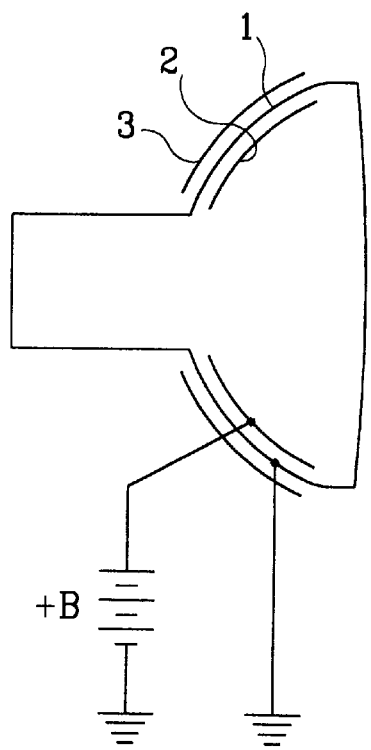
FIG.1B *(Prior Art)*
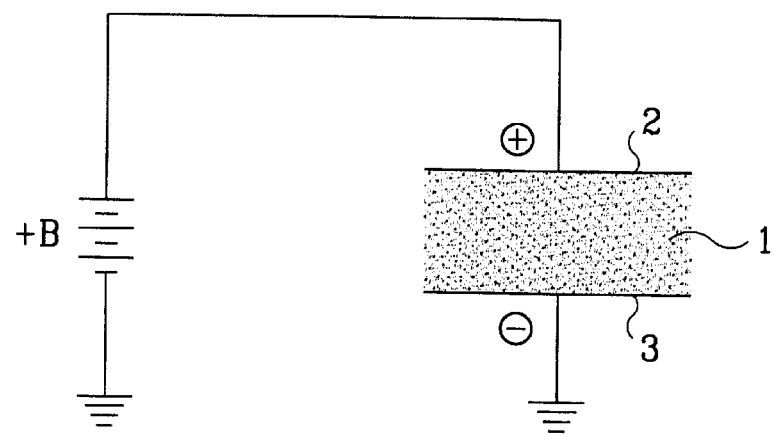

6,046,552

SPOT ELIMINATING CIRCUIT OF AN IMAGE DISPLAY DEVICE

CLAIM OF PRIORITY

This application makes reference to, incorporates the same herein, and claims all benefits accruing under 35 U.S.C. §119 from an application entitled Spot Eliminating Circuit Of Image Display Device earlier filed in the Korean Industrial Property Office on Dec. 30, 1999, and there duly assigned Ser. No. 96-78031 by that Office.

BACKGROUND OF THE INVENTION

1. Field of the Invention

The present invention relates to an image display device such as monitor or television set using a cathode ray tube, and more particularly to a circuit and process for preventing spots from occurring on the center portion of the screen of the cathode ray tube of a variable visual display when switching off electric power.

2. Description of the Prior Art

In general, a cathode ray tube is constructed with a pair of electrically conductive layers made of refined graphite on the inner and outer surfaces of a glass visual display panel. The glass serves as the dielectric of a capacitor having a capacitance of about 800~2000 pF and a very high withstand voltage.

When the cathode ray tube is activated, a high voltage is applied to conductive layer on the inner surface of the glass panel. At this state, even though electric power is turned off, remaining heat in the heater of the cathode ray tube keeps on emitting thermoelectrons. When the electric power is turned off, deflection is disable since no electric current to flow in the vertical deflection coil and the horizontal deflection coil. Therefore, an electron beam of the emitted thermoelectrons continues to be accelerated by a high voltage charged in the capacitor formed between conductive layers. The electron beam strikes the center portion of the fluorescent layer of the cathode ray tube and forms a spot on the phosphor coatings. The high voltage charge in the capacitor discharges over a long period; this causes deterioration ofthe fluorescent layer due to the continuous strong stimulus to the fluorescent layer.

Earlier efforts to prevent a spot from occurring on the cathode ray tube when an image display device is switched off apply a high level voltage to the grid of cathode ray tube during the application of the vertical blanking signal. Consequently, an electron beam generated from cathode is blocked by the grid so that a retrace line does not appear on cathode ray tube and since capacitor is connected between the power source and grid of the cathode ray tube, a negative voltage charge held by the capacitor is rapidly applied to the grid for a certain time period to prevent an electron beam from passing through. I have found that there are drawbacks in this approach because the increased capacitance increases production cost of a product since it is very expensive, and space for such a big capacitor must be provided for on a printed circuit board.

Other known circuits for preventing a spot from occurring on a screen of a cathode ray tube are exemplified by the following patents incorporated herein by reference: U.S. Pat. No. 5,677,730 to Tae-jin Park entitled Spot Elimination Circuit For A Cathode Ray Tube; U.S. Pat. No. 5,084,657 to Mitsunori Ueda entitled Spot Killer Circuit Having Blanking Function; and U.S. Pat. No. 4,340,910 to Silverio A. Valdes entitled CRT Spot Supression Circuit.

SUMMARY OF THE INVENTION

Therefore, it is an object of the present invention to provide an improved variable visual display process and apparatus.

It is another object to provide a process and circuit for preventing a spot from occurring.

It is yet another object to provide a process and apparatus for minimizing the occurrence of a central spot on a cathode ray tube by applying a negative voltage to the first grid of the cathode ray tube continuously for the time period during which a spot would occur.

To attain these and other objects, the spot eliminating process and circuit employs a charged voltage of a capacitor which is used for outputting a vertical blanking signal in a vertical blanking signal generating circuit. The charged voltage of the capacitor is rapidly discharged since the capacitance of the capacitor is small when electric power is switched off. Therefore, embodiments of the present invention are provided with a discharge cut-off element between the capacitor and a negative electric power source for preventing a charged voltage of the capacitor from being discharged so as to supply the negative charged voltage to the first grid continuously, so that a spot is prevented from occurring. When the negative electric power source continues to be applied to the first grid of the cathode ray tube, a luminance generation time is delayed by the charged voltage of the capacitor when electric power is turned on. Therefore, the present invention has a discharging element for discharging the charged voltage of the capacitor to control a discharging time period. The discharging time period of the discharging element is controlled according to the time that thermoelectrons are emitted from the cathode by remaining heat of the heater. When thermoelectrons are not emitted from the cathode, a value is set to discharge all the charged voltage of the capacitor.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 1A is a view for explaining the structure of a capacitor formed on the cathode ray tube;

FIG. 1B a view for showing an equivalent circuit of FIG. 1A;

DETAILED DESCRIPTION OF THE PREFERRED EMBODIMENT

In general, a cathode ray tube has conductive layers 2 and 3 on the inner and outer surfaces of a panel 1, as shown in FIG. 1A. Conductive layers 2 and 3 are made of refined graphite. A capacitor, having glass of panel 1 as a dielectric substance, is formed between conductive layers 2 and 3, as shown in FIG. 1B. The capacitor has a capacitance of about 800–2000 pF and a very high withstand voltage. Therefore, the capacitor formed between conductive layers 2 and 3 plays a role of a capacitor participating in a filtering operation of a high voltage regulating circuit.

When the cathode ray tube is activated, a high voltage +B is applied to conductive layer 2 on the inner surface of panel 1 so as to be charged in the capacitor formed between conductive layers 2 and 3. At this state, even though electric power is turned off, remaining heat in the heater of the cathode ray tube keeps on emitting thermoelectrons. Further, the turn-off of electric power disables deflection since no electric currents flow in the vertical deflection coil and the horizontal deflection coil. Therefore, an electron beam of the emitted thermoelectrons continues to be accelerated by a high voltage charged in the capacitor formed between conductive layers 2 and 3. Since the deflection is disabled, as mentioned above, the electron beam strikes the center portion of the fluorescent layer of the cathode ray tube so as to make a spot. The high voltage charged in the capacitor formed between conductive layers 2 and 3 is slowly discharged. Since a time period that the spot remains on the fluorescent layer is long because the discharging time period is long, the long spot-remaining time period causes the fluorescent layer to deteriorate due to the continuous strong stimulus to the fluorescent layer. Accordingly, it is desired not to have a spot form on the cathode ray tube when an image display device using a cathode ray tube is switched off.

Figure 2:
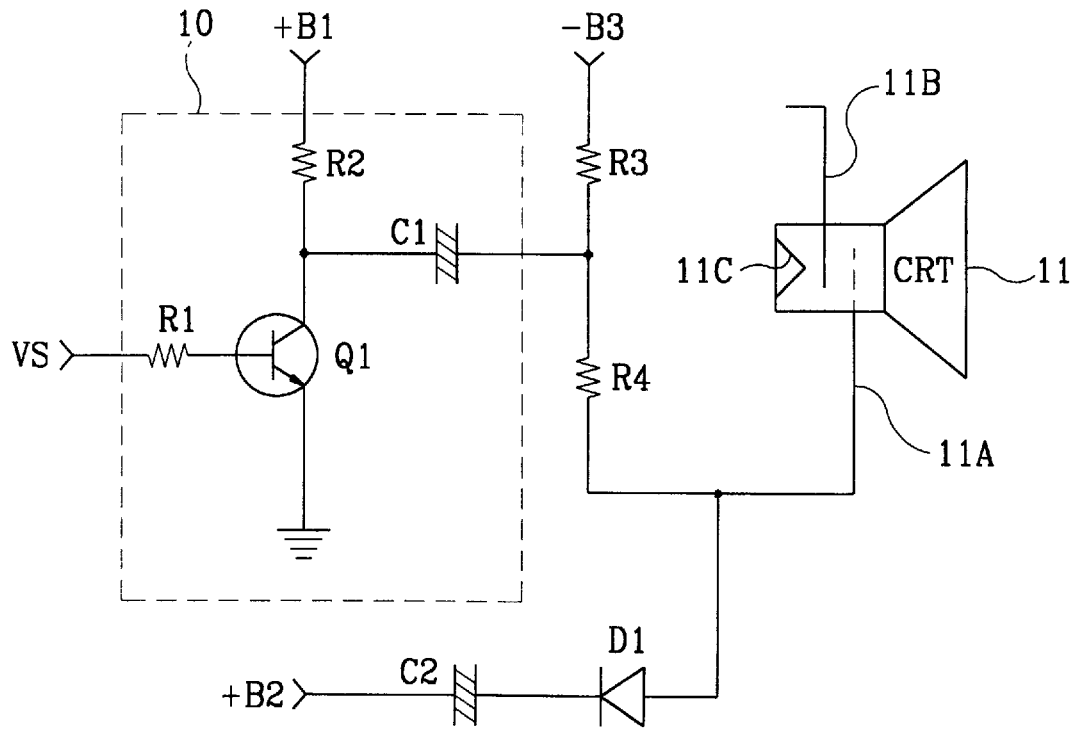
FIG. 2 is a view for showing a conventional spot eliminating circuit.

FIG. 2 is a view of a conventional spot eliminating circuit for preventing a spot from occurring on the cathode ray tube when an image display device is switched off. Reference numeral 10 denotes a vertical blanking signal generating circuit. As shown in FIG. 2, in the vertical blanking signal generating circuit 10, a vertical synchronizing signal $\overline{VS}$ is applied to the base of a transistor Q1 through a resistor R1, the collector of transistor Q1 is connected to a first electric power source +B1 through a resistor R2, and one terminal of a capacitor C1 is connected between the collector and the resistor R2. The other terminal of capacitor C1 is connected to a second electric power source −B3 through a resistor R3 and to a first grid 11A of a cathode ray tube 11 through a resistor R4. A third electric power source +B2 is applied to grid 11A of cathode ray tube 11 through a capacitor C2 and a diode D1, and diode D1 is reverse-biased by electric power source +B2. Reference numeral 11B denotes a cathode of cathode ray tube 11 and reference numeral 11C denotes a heater of cathode ray tube 11.

In the conventional spot eliminating circuit having the above structure, heater 11C of cathode ray tube 11 is heated due to an electric power source when a cathode ray tube 11 is turned on, and heated heater 11C causes cathode 11B to emit thermoelectrons to form an electron beam. The neck portion of cathode ray tube 11 is provided with a vertical deflection coil (not shown) and a horizontal deflection coil (not shown), and electric currents in the vertical deflection coil and the horizontal deflection coil generate magnetic fields for horizontal and vertical deflections. In this state, a vertical synchronizing signal $\overline{VS}$ of a low level voltage is input to vertical blanking signal generating circuit 10 for a vertical retrace line interval. The input vertical synchronizing signal $\overline{VS}$ is applied to the base of transistor Q1 through resistor R1. Transistor Q1 converts the vertical synchronizing signal $\overline{VS}$ to a vertical blanking signal of a high level voltage which is output from the collector. The vertical blanking signal of a high level voltage from the collector of transistor Q1 passes through capacitor C1 to be superimposed with a voltage which is generated by voltage-dropping of power source −B3 through resistor R3. The superimposed vertical blanking signal is supplied to grid 11A of cathode ray tube 11 through resistor R4. Therefore, since a high level voltage is applied to grid 11A of cathode ray tube 11 during the application of the vertical blanking signal, an electron beam generated from cathode 11B is blocked by grid 11A so that a retrace line does not appear on cathode ray tube 11. At this time, since capacitor C2 is connected between power source +B2 and grid 11A of cathode ray tube 11, a negative voltage charged in capacitor C2 is rapidly applied to grid 11A through diode D1 for a certain time period, to thereby prevent an electron beam from passing through.

Here, diode D1 is used for blocking a reverse flow of current. Such a conventional spot eliminating circuit is intended for eliminating a spot by applying a negative voltage to grid 11A of cathode ray tube 11 for a certain time period when electric power is switched off. Therefore, it is intended that a spot does not occur at the beginning of turning off electric power when a negative voltage is applied to grid 11A for a short time period, but the spot occurs after a certain time period has elapsed. Further, when a high beam state occurs due to a high luminance signal, a spot occurs because a negative voltage is not applied to grid 11A of cathode ray tube 11 at the beginning of turning off electric power. Accordingly, it has been determined that the capacitance of capacitor C2 needs to be increased to continue to supply a negative voltage to grid 11A in order for a spot not to occur for a certain time period when turning off electric power.

Hereinafter, a spot eliminating circuit according to the present invention will be described in detail with reference to the accompanying drawings of FIGS. 3 and 4. The same parts as above mentioned is referred to as the same reference numerals.

Figure 3:
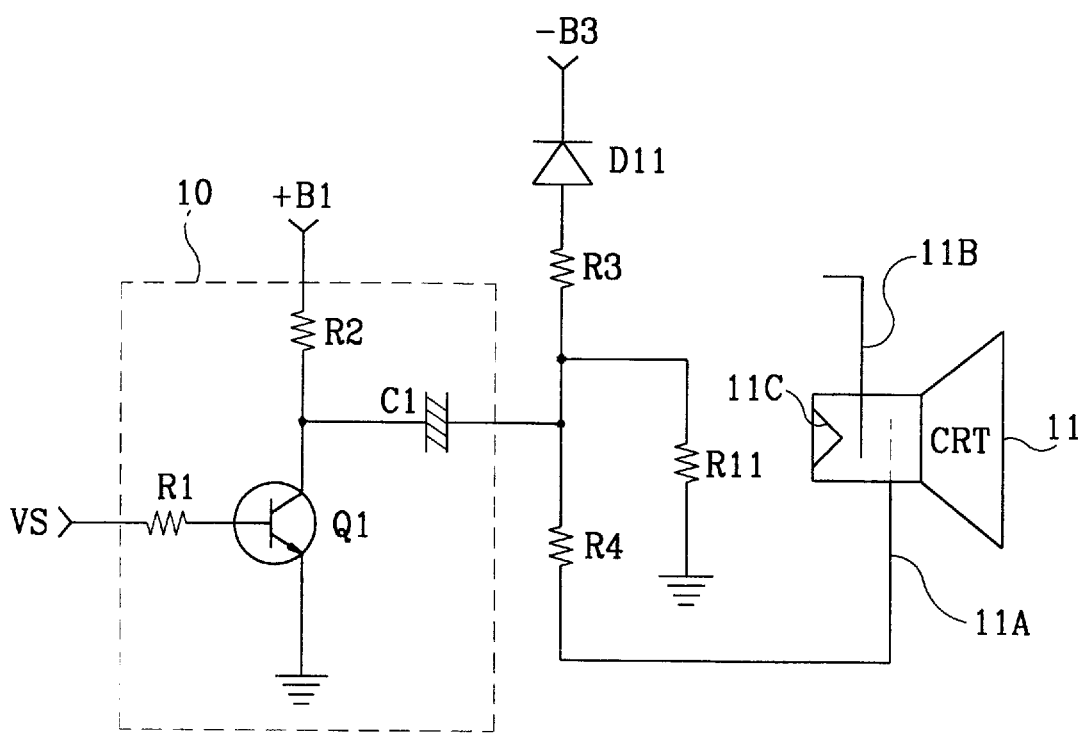
FIG. 3 is a view for showing a spot eliminating circuit constructed according to the principles of the present invention.
Figure 4:
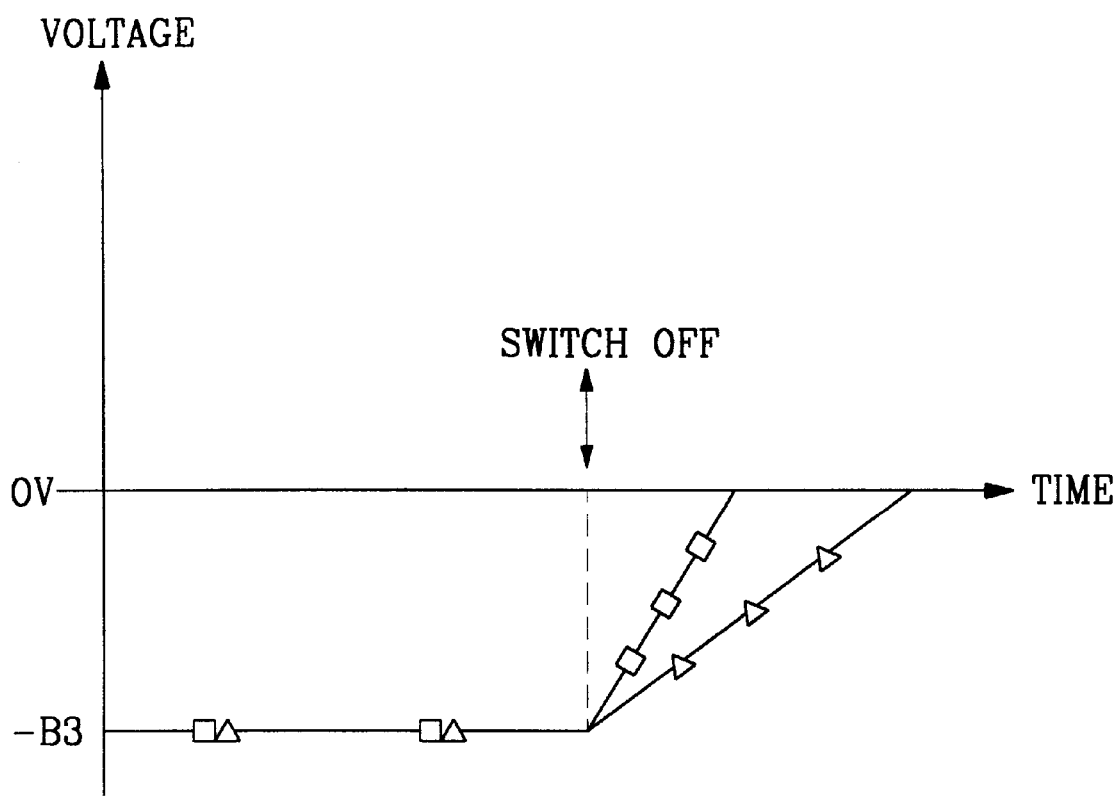
FIG. 4 is a graph for showing voltage changes applied to a first grid in a cathode ray tube in the spot eliminating circuit constructed according to the principles of the present invention.

As shown in FIG. 3, the terminal, i.e., output terminal, of capacitor C1 for outputting the vertical blanking signal from vertical blanking signal generating circuit 10 is connected to electric power source −B3 through resistor R3 and a reverse-biased diode D11 which is a discharging cut-off element. A resistor R11 is connected to the node between the output terminal of capacitor C1 and resistor R3, and grid 11A of cathode ray tube 11 is connected to this node through resistor R4.

The spot eliminating circuit having the above structure heats heater 11C of cathode ray tube 11 when electric power is turned on so as to emit thermoelectrons from cathode 11B, to thereby form an electron beam. At this state, a vertical synchronizing signal $\overline{VS}$ having a low voltage level is input through the resistor R1 to the vertical blanking signal generating circuit 10 during a vertical retrace line interval and is converted by transistor Q1 to a vertical blanking signal having a high voltage level. The high voltage level vertical blanking signal passes through capacitor C1 and is superimposed on the voltage provided by power source −B3 supplied through diode D11 and resistor R3. The superimposed vertical blanking signal is then applied to grid 11A of the cathode ray tube 11 through resistor R4 so that a high voltage is applied to grid 11A of the cathode ray tube 11 in order to prevent an electron beam generated by cathode 11B from passing through grid 11A, to thereby preventing a retrace line from being displayed. At this state, when electric power source +B1 and −B3 are not supplied with electric power due the power being turned off, the present invention drops the voltage of one terminal of capacitor C1 connected between the resistor R2 and the transistor Q1 to a zero voltage level, and supplies a negative voltage charged in capacitor C1 from the output terminal of capacitor C1 to grid 11A of the cathode ray tube 11 through resistor R4, so that a spot does not occur.

At this time, diode D11 is reverse-biased to be in a cut-off state, and the charged voltage of capacitor C1 is nearly preserved because grid 11A of the cathode ray tube 11 has a very high resistance of a few Mega-ohms (MΩ), to thereby supply the negative charged voltage to grid 11A of cathode ray tube 11 continuously in order for a spot to be prevented from occurring.

Further, a negative voltage charged in capacitor C1 for a long time is applied to grid 11A of cathode ray tube 11 causes delayed luminance to occur when the electric power is turned on again.

Therefore, in the present invention, by connecting the grounded resistor R11 between the resistor R3 and resistor R4, the negative charged voltage of capacitor C1 is discharged through resistor R11. Here, as shown in FIG. 4, a discharging time period of a negative voltage charged in capacitor C1 becomes short when a resistance value of resistor R11 is small, and becomes long when the resistance value of resistor R11 is large. Therefore, a discharging time period can be controlled by changing the resistance value of resistor R11 in the present invention. Preferably, all the voltage charged in the capacitor C1 is discharged when thermoelectrons are not emitted from the cathode 11B.

As mentioned above, the present invention is constructed in a simple structure and prevents a spot from occurring from the cathode ray tube by using a capacitor of a small capacitance which is usually used, rather than a capacitor of a large capacitance, so that the production cost of a product is reduced as well as room for the capacitor is easily secured on a printed circuit board.

What is claimed is:

1. A spot eliminating circuit of an image display device, comprising:

a capacitor of a vertical blanking signal generating circuit which generates a vertical blanking signal according to a vertical synchronizing signal;

a discharging cut-off means for applying a negative voltage charged in the capacitor to a first grid of a cathode ray tube by preventing the negative voltage from being discharged; and a discharging means for discharging the negative voltage charged in the capacitor.

2. The spot eliminating circuit as claimed in claim 1, wherein the discharging cut-off means is a diode.

3. The spot eliminating circuit as claimed in claim 1, wherein the discharging means is a resistor.

4. The spot eliminating circuit as claimed in claim 1, wherein the discharging means is set to have a resistance value which enables all the negative voltage charged in the capacitor to be discharged by the time a time period has elapsed during which occurrence of a spot is blocked.

5. The spot eliminating circuit as claimed in claim 3, wherein the resistor is set to have a resistance value which enables all the negative voltage charged in the capacitor to be discharged by the time a time period has elapsed during which occurrence of a spot is blocked.

6. A spot eliminating circuit of a cathode ray tube, comprising:

a vertical blanking signal generating circuit for generating a vertical blanking signal in response to a vertical synchronizing signal, said vertical blanking signal generating circuit having an output capacitor for outputting said vertical blanking signal to a node;

a reverse biased diode connected between a negative voltage and a first resistor, said first resistor being connected between said reverse biased diode and said node;

a second resistor having a predetermined resistance value, said second resistor being connected between said node and a ground terminal; and a third resistor connected between said node and a grid of said cathode ray tube.

7. The spot eliminating circuit as set forth in claim 6, said predetermined resistance value being set to enable all of a negative voltage charged in said capacitor to be discharged by the time a time period has elapsed during which occurrence of a spot is blocked.

* * * * *